(12) United States Patent
Fripp et al.

(10) Patent No.: US 11,493,145 B2
(45) Date of Patent: Nov. 8, 2022

(54) DENSITY-BASED FLUID FLOW CONTROL DEVICE

(71) Applicant: HALLIBURTON ENERGY SERVICES, INC., Houston, TX (US)

(72) Inventors: Michael Linley Fripp, Carrollton, TX (US); Stephen Michael Greci, Little Elm, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 302 days.

(21) Appl. No.: 16/646,018

(22) PCT Filed: Oct. 17, 2017

(86) PCT No.: PCT/US2017/056946
§ 371 (c)(1),
(2) Date: Mar. 10, 2020

(87) PCT Pub. No.: WO2019/078821
PCT Pub. Date: Apr. 25, 2019

(65) Prior Publication Data
US 2020/0308927 A1 Oct. 1, 2020

(51) Int. Cl.
*F16K 33/00* (2006.01)
*E21B 34/06* (2006.01)
(Continued)

(52) U.S. Cl.
CPC ............ *F16K 33/00* (2013.01); *E21B 34/06* (2013.01); *F16K 31/18* (2013.01); *F16K 31/30* (2013.01); *E21B 43/14* (2013.01)

(58) Field of Classification Search
CPC .......... E21B 34/06; E21B 34/08; E21B 43/14; E21B 43/12; F16K 31/30; F16K 31/18; F16K 33/00
See application file for complete search history.

(56) References Cited

U.S. PATENT DOCUMENTS 7,409,999 B2* 8/2008 Henriksen ............... E21B 43/12
166/330
9,453,395 B2* 9/2016 Fripp ..................... E21B 43/12
(Continued)

FOREIGN PATENT DOCUMENTS

WO 2007027617 A2 3/2007

OTHER PUBLICATIONS

PCT/US2017/056946, "International Search Report and Written Opinion", dated Jul. 12, 2018, 12 pages.

*Primary Examiner* — George S Gray
(74) *Attorney, Agent, or Firm* — Kilpatrick Townsend & Stockton LLP

(57) ABSTRACT

A fluid flow control device can include an inlet port and an outlet port. The fluid flow control device can also include a rotatable component for rotating about an axis in response to fluid flow from the inlet port. A float component positioned within the rotatable component can move between (i) an open position that enables fluid flow from the inlet port to the outlet port, and (ii) a closed position that restricts fluid flow from the inlet port to the outlet port. The float component can move from the open position to the closed position in response to a fluid from the inlet port having one density. The float component can move from the closed position to the open position in response to the fluid from the inlet port having another density.

20 Claims, 7 Drawing Sheets

(51) Int. Cl.
*F16K 31/30* (2006.01)
*F16K 31/18* (2006.01)
*E21B 43/14* (2006.01)

(56) References Cited

U.S. PATENT DOCUMENTS

2013/0092393 A1   4/2013   Dykstra et al.
2015/0000751 A1   1/2015   Nicholson
2015/0013978 A1   1/2015   Nenniger
2017/0260829 A1   9/2017   Aadny

* cited by examiner

DENSITY-BASED FLUID FLOW CONTROL DEVICE

TECHNICAL FIELD

The present disclosure relates generally to devices for use in controlling fluid flow. More specifically, but not by way of limitation, this disclosure relates to a density-based fluid flow control device.

BACKGROUND

Production tubing and other equipment can be installed in a wellbore of a well system (e.g., an oil or gas well) for communicating fluid in the wellbore to the well surface. The resulting fluid at the well surface is referred to as production fluid. Production fluid can include a mix of different fluid components, such as oil, water, and gas, and the ratio of the fluid components in the production fluid can change over time. This can make it challenging for a well operator to control which types of fluid components are produced from the wellbore. For example, it can be challenging for a well operator to produce mostly oil from the wellbore, while reducing or eliminating the production of gas or water from the wellbore.

DETAILED DESCRIPTION

Certain aspects and features of the present disclosure relate to a fluid flow control device that can toggle between an open position that enables fluid flow through the fluid flow control device and a closed position that restricts (e.g., prevents) fluid flow through the fluid flow control device based on a density of the fluid. In one example, the fluid flow control device includes an inlet port, an outlet port, and a rotatable component for rotating about an axis in response to fluid flow from the inlet port. The rotatable component includes a float component that can move between (i) an open position that enables fluid flow from the inlet port to the outlet port, and (ii) a closed position that restricts fluid flow from the inlet port to the outlet port. The float component can move to the closed position when a higher-density fluid, such as water, flows through the fluid flow control device at least in part due to a force that is applied to the float component as the rotatable component rotates. This can prevent the higher-density fluid from flowing out the outlet port. And the float component can move to the open position when a lower-density fluid, such as oil or gas, flows through the fluid flow control device at least in part due to the force. This can enable the lower-density fluid to flow out the outlet port. In this manner, the fluid flow control device can selectively control fluid flow to the outlet port based on the density of the fluid.

In some examples, applying the force to the float component by rotating the rotatable component can improve the ability of the float component to toggle between the open and closed positions, as discussed in greater detail below. The force can also make the fluid flow control device insensitive to orientation, because the force can overcome the effects of gravity. This can enable the fluid flow control device to be used in a variety of settings and positionings that may be impractical for other types of fluid flow control devices.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
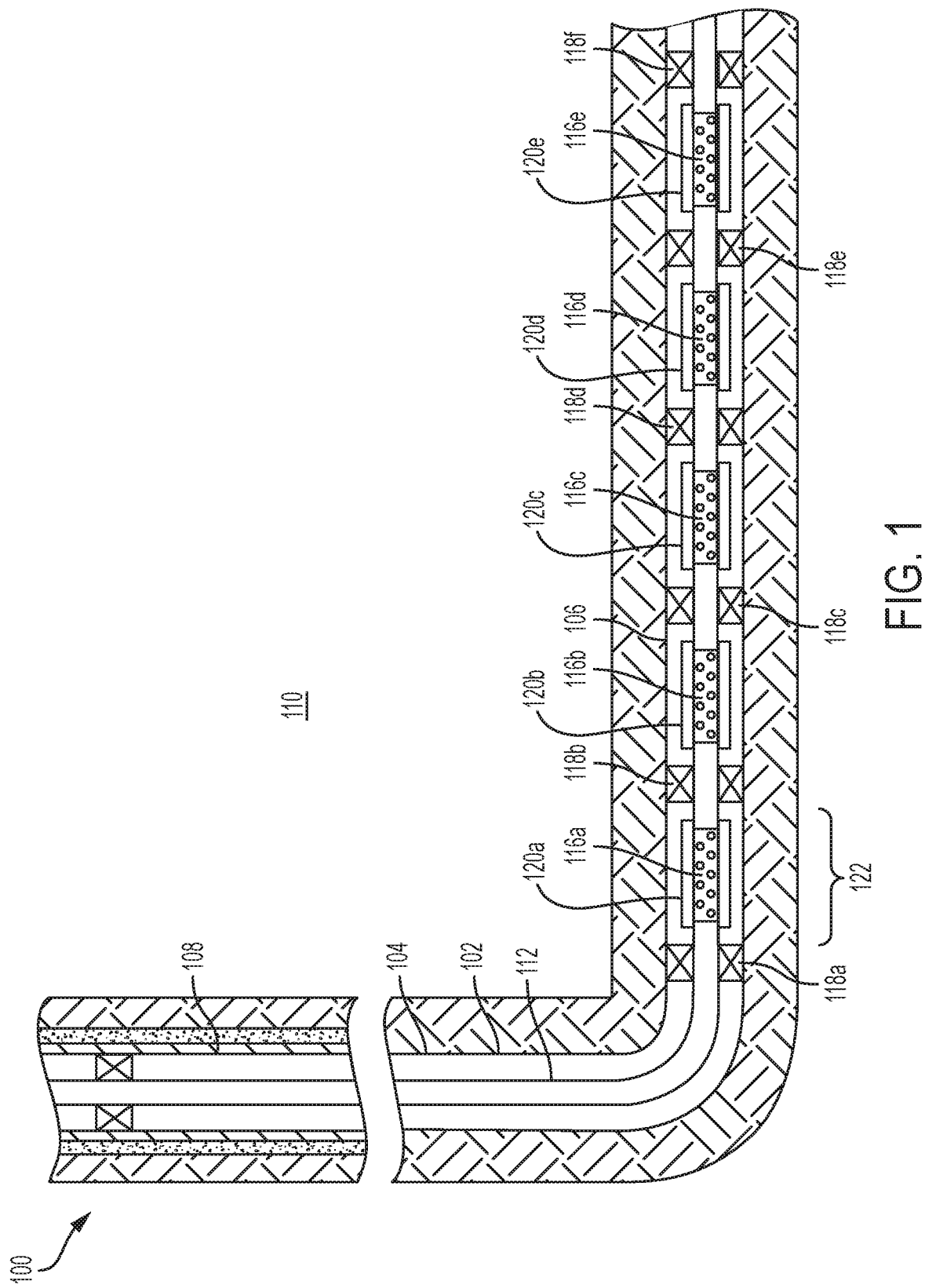
FIG. 1 is a cross-sectional side view of an example of a well system according to some aspects.

FIG. 1 is a cross-sectional side view of an example of a well system 100 according to some aspects. The well system 100 includes a wellbore 102 extending through various earth strata of a subterranean formation 110. In this example, the wellbore 102 has a substantially vertical section 104 and a substantially horizontal section 106. The substantially vertical section 104 may include a casing string cemented at an upper portion of the substantially vertical section 104.

A tubing string 112 extends from the well's surface to within wellbore 102. The tubing string 112 can provide a conduit for fluid (e.g., production fluid) to travel from the substantially horizontal section 106 to the well's surface. The tubing string 112 can include production tubular sections 116a-e at various production intervals adjacent to the subterranean formation 110. Packers 118a-f can be positioned on the left and right sides of production tubular sections 116a-e to define production intervals (e.g., production interval 122) and provide fluid seals between the tubing string 112 and the wall of the wellbore 102.

The production tubular sections 116a-e can include inflow control devices 120a-e (ICDs). An inflow control device can control the volume or composition of the fluid flowing from a production interval into a production tubular section. For example, the production interval 122 may produce more than one type of fluid component, such as a mixture of water, steam, carbon dioxide, and natural gas. The inflow control device 120a can reduce or restrict the flow of fluid into the production tubular section 116a when the production interval 122 is producing a higher proportion of an undesirable fluid component, such as water. This can enable the other production intervals that are producing a higher proportion of a desired fluid component (e.g., oil) to contribute more to the production fluid at the well's surface, so that the production fluid has a higher proportion of the desired fluid component. In some examples, the inflow control devices 120a-e can be an autonomous inflow control devices (AICD) that can allow or restrict fluid flow into the production tubular sections 116a-e based on fluid density, without requiring signals from the well's surface by the well operator.

Although FIG. 1 depicts each production tubular section 116a-e having an inflow control device 120a-e, in other examples not every production tubular section 116a-e may have an inflow control device 120a-e. Also, the production tubular sections 116a-e (and the inflow control devices 120a-e) can be located in the substantially vertical section 104 additionally or alternatively to the substantially horizontal section 106. Further, any number of production tubular sections 116a-e with inflow control devices 120a-e, including one, can be used in the well system 100. In some examples, production tubular sections 116a-e with inflow control devices 120a-e can be disposed in simpler wellbores, such as wellbores having only a substantially vertical section 108. The inflow control devices 120a-e can be disposed in cased wells or in open-hole environments.

Figure 2:
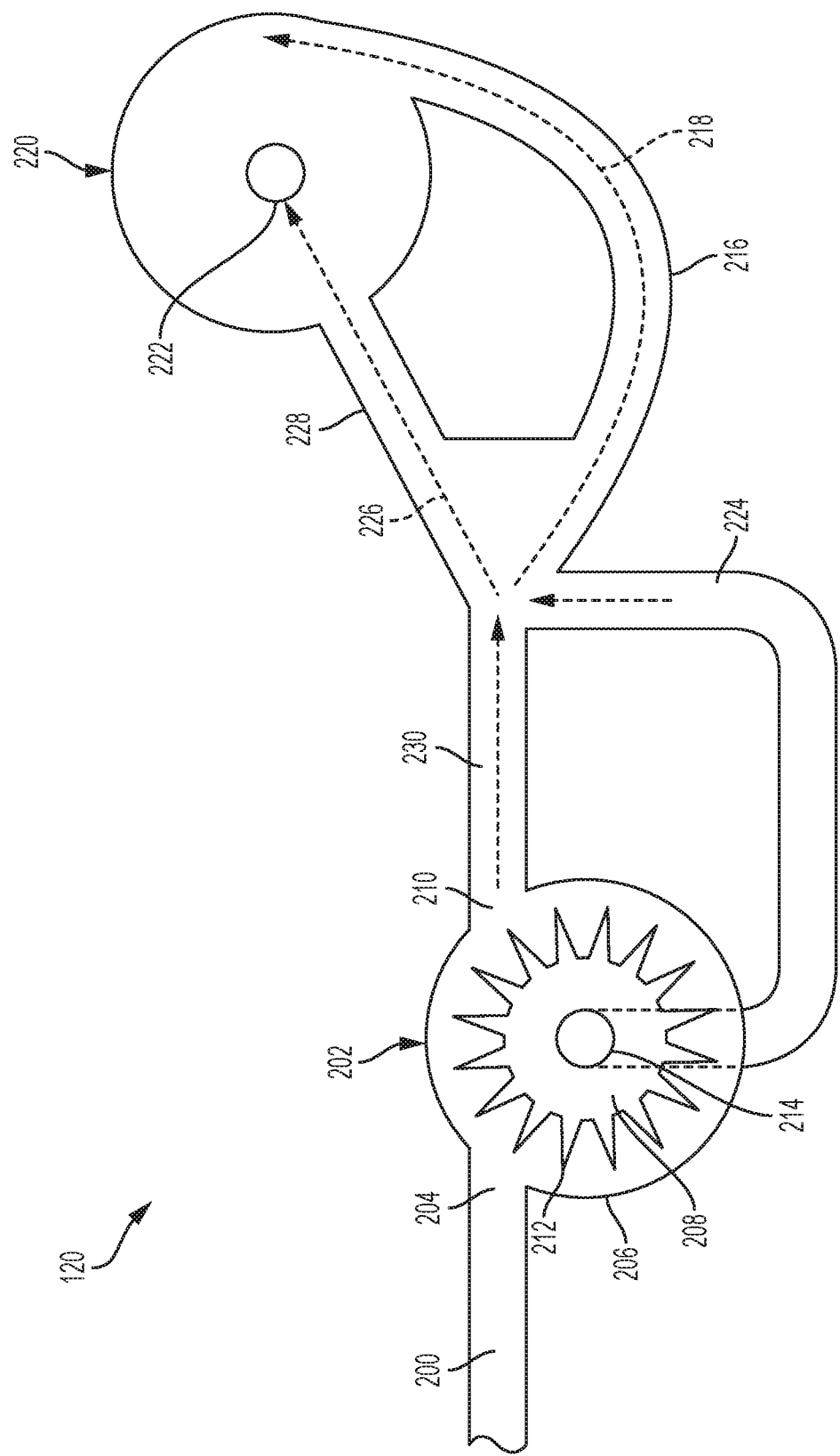
FIG. 2 is a cross-sectional view of an example of an inflow control device according to some aspects.

FIG. 2 is a cross-sectional view of an example of an inflow control device 120 according to some aspects. The inflow control device 120 can include an inflow tubular 200 coupled to a fluid flow control device 202. Although the word "tubular" is used to refer to certain components in the present disclosure, those components can have any suitable shape, including a non-tubular shape. The inflow tubular 200 can provide fluid to the fluid flow control device 202. The fluid can be provided from a production interval in a well system or from another location. The inflow tubular 200 can terminate at an inlet port 204 that provides a fluid communication pathway into the fluid flow control device 202. In some examples, the inlet port 204 is an opening in a housing 206 of the fluid flow control device 202.

A first fluid portion can flow from the inlet port 204 toward a bypass port 210. The first fluid portion can push against protrusions 212 (e.g., fins) extending outwardly from a rotatable component 208 to cause the rotatable component 208 to rotate about an axis, such as a central axis. Rotation of the rotatable component 208 about the axis can generate a force on a float component (not shown) positioned within the rotatable component 208, as described in greater detail with respect to FIG. 3. After passing by the rotatable component 208, the first fluid portion can exit the fluid flow control device 202 via the bypass port 210. From the bypass port 210, the first fluid portion can flow through a bypass tubular 230 to a tangential tubular 216. The first fluid portion can flow through the tangential tubular 216, as shown by dashed arrow 218, into a vortex valve 220. The angle at which the first fluid portion enters the vortex valve 220 can cause the first fluid portion to spin around an outer perimeter of the vortex valve 220. Forces can act on the first fluid portion, eventually causing the first fluid portion to flow into a central port 222 of the vortex valve 220. The first fluid portion can be then communicated from the central port 222 elsewhere, such as to a well surface as production fluid.

At the same time, a second fluid portion from the inlet port 204 can flow into the rotatable component 208 via holes in the rotatable component 208 (e.g., holes in the protrusions 212 of the rotatable component 208). If the density of the second fluid portion is high, the float component can move to a closed position. This can prevent the second fluid portion from flowing to an outlet port 214, and instead cause the second fluid portion to flow out the bypass port 210. For example, if the second fluid portion is mostly water, which has a relatively high density, the float component can float into the closed position, thereby preventing the second fluid portion from flowing into the outlet port 214. If the density of the second fluid portion is low (e.g., if the second fluid portion is mostly oil or gas), the float component can move to an open position that enables the second fluid portion to flow out the outlet port 214 and into a control tubular 224. In this manner, the fluid flow control device 202 can autonomously direct fluids through different pathways based on the densities of the fluids. The control tubular 224 can direct the second fluid portion, along with the first fluid portion, toward the central port 222 of the vortex valve 220 via a more direct fluid pathway, as shown by dashed arrow 226 and defined by tubular 228. The more direct fluid pathway to the central port 222 can enable the second fluid portion to more directly flow into the central port 222, without first spinning around the outer perimeter of the vortex valve 220. If the bulk of the fluid enters the vortex valve 220 along the pathway defined by dashed arrow 218, then the fluid will tend to spin before exiting through the central port 222 and will have a high fluid resistance. If the bulk of the fluid enters the vortex valve 220 along the pathway defined by dashed arrow 226, then the fluid will tend to exit through the central port 222 without spinning and will have minimal flow resistance.

In some examples, the above-mentioned concepts can be enhanced by the rotation of the rotatable component 208. Typically, the buoyancy force generated by the float component is small because the difference in density between the lower-density fluid and the higher-density fluid is generally small, and there is only a small amount (e.g., 5 milli-Newtons) of gravitational force acting on this difference in density. This can make the fluid flow control device 202 sensitive to orientation, can cause the float component to get stuck in the open position or the closed position, and have other disadvantages. But rotation of the rotatable component 208 can create a force (e.g., a centripetal force or a centrifugal force) on the float component. The force can act as artificial gravity that is much higher than the small gravitational force naturally acting on the difference in density. This can enable the fluid flow control device 202 to more reliably toggle between the open and closed positions based on the density of the fluid. This can also make the fluid flow control device 202 perform in a manner that is insensitive to orientation, because the force generated by the rotatable component 208 is much larger than the naturally occurring gravitational force.

In some examples, the fluid flow control device 202 can direct a fluid along the more direct pathway shown by dashed arrow 226 or along the tangential pathway shown by dashed arrow 218. Whether the fluid flow control device 202 directs the fluid along the pathway shown by dashed arrow 226 or the dashed arrow 218 can depend on the composition of the fluid. Directing the fluid in this manner can cause the fluid resistance in the vortex valve 220 to change based on the composition of the fluid.

The fluid flow control device 202 can be used with any type of valve. For example, although FIG. 2 includes a vortex valve 220, in other examples the vortex valve 220 can be replaced with other types of fluidic valves, including valves that have a moveable valve-element, such as a rate controlled production valve. Also, in some examples, the fluid control device 202 can operate as a pressure sensing module in a valve.

Figure 3:
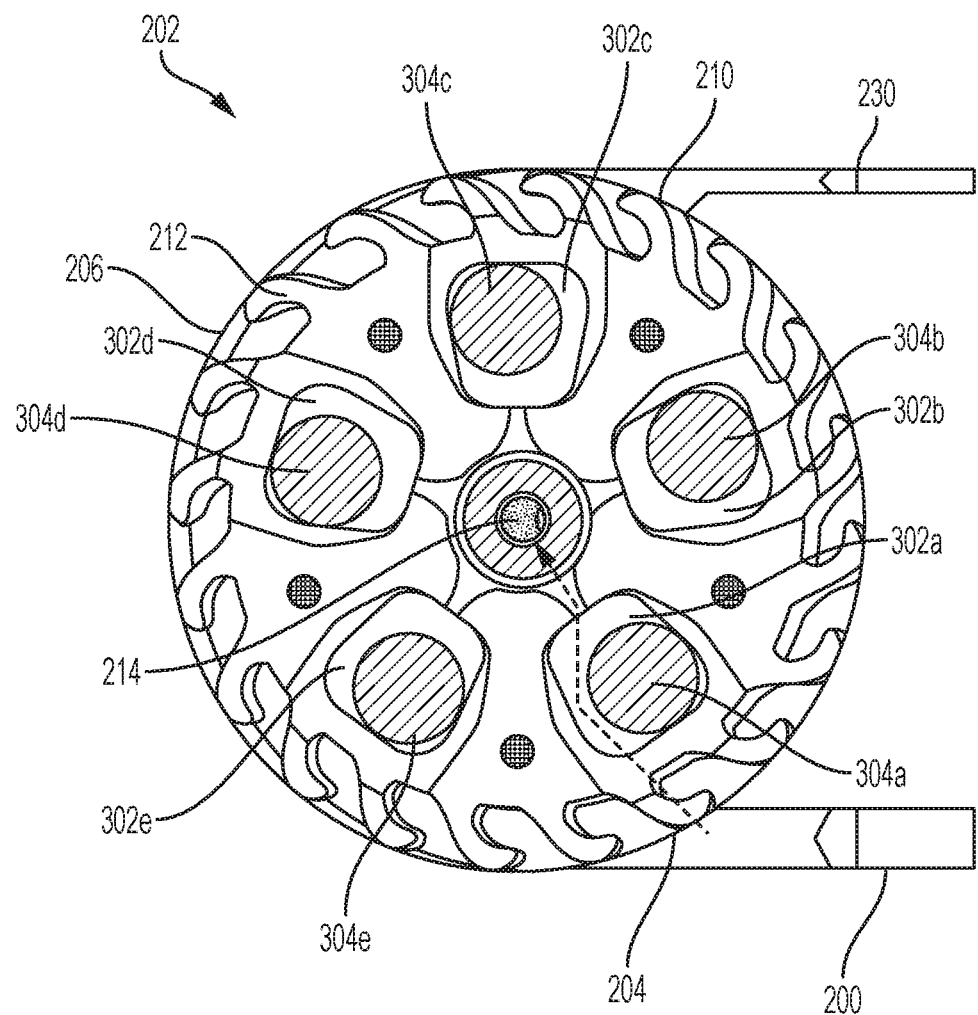
FIG. 3 is a cross-sectional view of an example of a fluid flow control device in an open position according to some aspects.

FIG. 3 is a cross-sectional view of an example of a fluid flow control device 202 in an open position according to some aspects. As discussed above, the fluid flow control device 202 can include a housing 206 to which an inflow tubular 200 and a bypass tubular 230 are coupled via an inlet port 204 and a bypass port 210, respectively. The housing 206 can have any suitable shape. In this example, the housing 206 has a circular shape.

The fluid flow control device 202 can also include a rotatable component 208. The rotatable component 208 can rotate about an axis (e.g., extending perpendicularly through the page), which can be a central axis extending through a center of the housing 206. In this example, the outlet port 214 forms the axis around which the rotatable component 208 can rotate. The rotatable component 208 can have one or more protrusions 212 extending radially outwardly from the axis and toward the housing 206. The protrusions 212 can have any suitable shape and size for interacting with fluid flowing between the inlet port 204 and the outlet port 214 to cause the rotatable component 208 to rotate.

The rotatable component 208 can include one or more fluid pathways for communicating fluid from outside the rotatable component 208 to the outlet port 214. In the example shown in FIG. 3, there are five fluid pathways, one of which is represented by a dashed arrow. Each fluid pathway can extend from a respective opening in the rotatable component 208 (for receiving fluid from the inlet port 204), into to a respective chamber 302a-e, and then to the outlet port 214. Although the fluid pathways and chambers 302a-e are shown as being substantially identical in shape in FIG. 3, in other examples the fluid pathways and chambers 302a-e can have any number and combination of shapes.

The rotatable component 208 can also include float components 304a-e positioned in the chambers 302a-e. Positioning the float components 304a-e in the chambers 302a-e can protect the float components 304a-e, improving the lifespan of the fluid flow control device 202. In the example shown in FIG. 3, there are five float components 304a-e positioned in five chambers 302a-e, with each respective chamber 302a-e having a respective float component 304a-e. The float components 304a-e can be formed from any number and combination of materials. For example, the float components 304a-e can include a syntactic foam with low-density hollow glass spheres that are bonded together with a ceramic, plastic, or an epoxy. As another example, the float components 304a-e can include a solid low-density material, such as acrylonitrile butadiene styrene (ABS), nylon, polyethylene, rubber, phenylene oxide (PPO), polyphenylene sulfide (PPS), or any combination of these. The float components 304a-e can have any suitable sizes and shapes. For example, in FIG. 3, the float components 304a-e all have spherical shapes. But in other examples, the float components 304a-e can have cylindrical shapes, rectangular shapes, square shapes, triangular shapes, or any combination of these.

The float components 304a-e can also have any suitable density. In some examples, the density of a float component can be between a lower-density fluid and a higher-density fluid. Examples of the lower-density fluid can be oil or gas and an example of the higher-density fluid can be water or oil. If the density of the float component is between the lower-density fluid and the higher-density fluid, the float component can move outward to the open position when the lower-density fluid flows through the fluid flow control device 202 and move inward to the closed position when the higher-density fluid flows through the fluid flow control device 202. In other examples, the force generated by the rotatable component 208 can enable a float component to have a higher density than both the lower-density fluid and the higher-density fluid. For example, when the fluid flowing through the fluid flow control device 202 is the higher-density fluid, a fluid drag may be created that forces the float components 304a-e into the closed position, thereby restricting fluid flow to the outlet port 214. When the fluid flowing through the fluid flow control device 202 is the lower-density fluid, the force generated by rotating the rotatable component 208 may overcome the fluid drag and enable the float components 304a-e to move outwardly to the open position, allowing fluid to flow into the outlet port 214. Thus, the float components 304a-e need not have densities between the lower-density fluid and the higher-density fluid.

As discussed above, each float component 304a-e can move within a respective chamber 302a-e between (i) an open position that enables fluid flow from the inlet port 204 to the outlet port 214 and (ii) a closed position that restricts fluid flow from the inlet port 204 to the outlet port 214. The float components 304a-e can move between the open position and the closed position based on the density of the fluid flowing through the fluid flow control device 202 (e.g., in an autonomous manner). In the example shown in FIG. 3, the float components 304a-e are all in respective open positions, which can allow fluid to flow into the rotatable component 208, through the chambers 304a-e, past the float components 304a-e, and then into the outlet port 214. One of these fluid flow pathways is represented by the dashed arrow.

Figure 4:
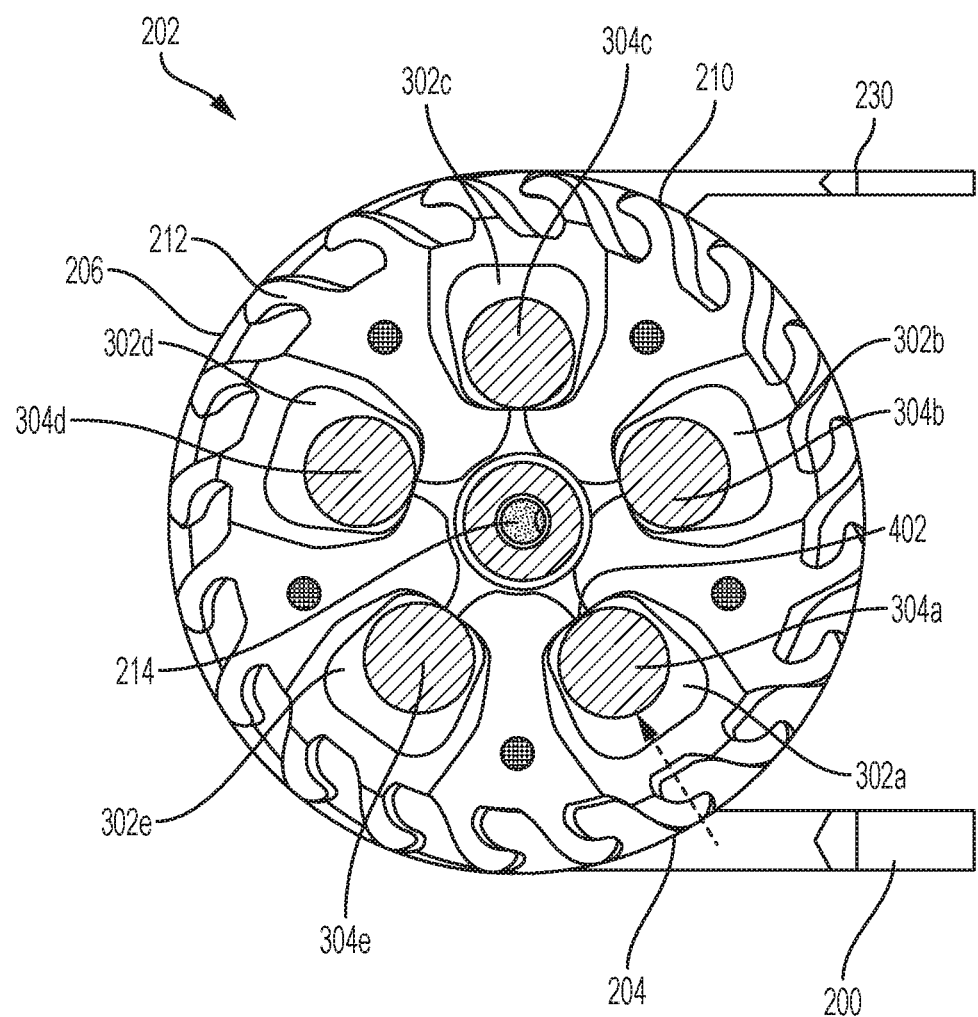
FIG. 4 is a cross-sectional view of an example of a fluid flow control device in a closed position according to some aspects.

FIG. 4 shows an example of the float components 304a-e in respective closed positions. When the float components 304a-e are in respective closed positions, they can restrict fluid flow to the outlet port 214, as indicated by a dashed arrow. In the example shown in FIG. 4, the float components 304a-e themselves are restricting fluid flow to the outlet port 214 by pressing into respective seats, such as seat 402, in the chambers 304a-e to create fluid seals. But in other examples, the float components 304a-e can interact with intermediary components (e.g., poppets or hinges) to restrict or allow fluid flow to the outlet port 214. The intermediary components may be more specifically shaped and sized to fit into the seat than the float components 304a-e and may therefore provide a better fluid seal than the float components 304a-e. As a particular example, when the fluid flowing through the fluid flow control device 202 has a higher density, a float component can push a poppet (positioned in a chamber) into a seat to form a fluid seal, thereby restricting fluid flow to the outlet port 214. When the fluid flowing through the fluid flow control device 202 has a lower density, the float component can release the poppet from the seat to enable fluid flow to the outlet port 214.

Figure 5:
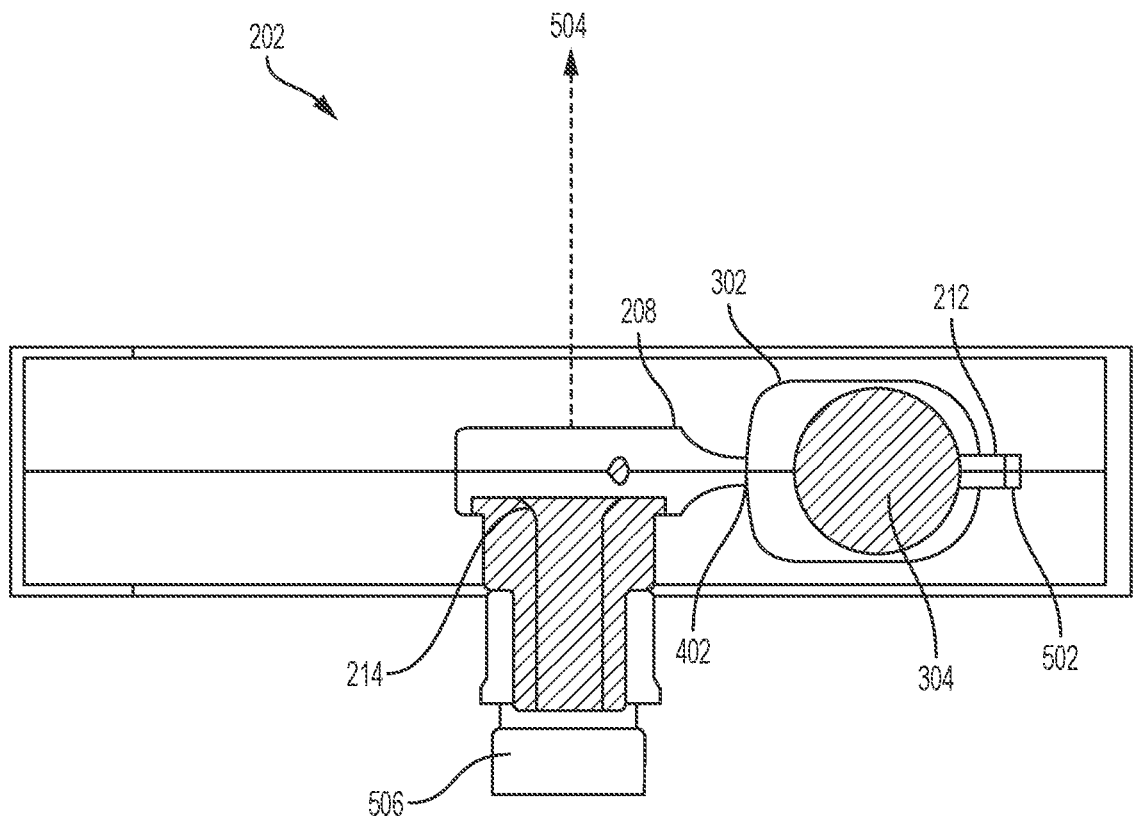
FIG. 5 is a cross-sectional side view of an example of a fluid flow control device according to some aspects.

FIG. 5 is a cross-sectional side view of an example of a fluid flow control device 202 according to some aspects. In this example, the inlet and bypass ports are not shown for clarity. The fluid flow control device 202 includes a rotatable component 208 that has a single fluid pathway extending from an opening 502 in a protrusion 212, into a chamber 302, past a float component 304, and into the outlet port 214. The rotatable component 208 can rotate about axis 504 to generate a force on the float component 304. The float component 304 can move between an open position and a closed position, as discussed above. When the float component 304 is in the open position (e.g., as shown in FIG. 5), fluid can pass through the outlet port 214 into a pipe 506, which can be a base pipe, a control tubular, or another pipe.

Figure 6:
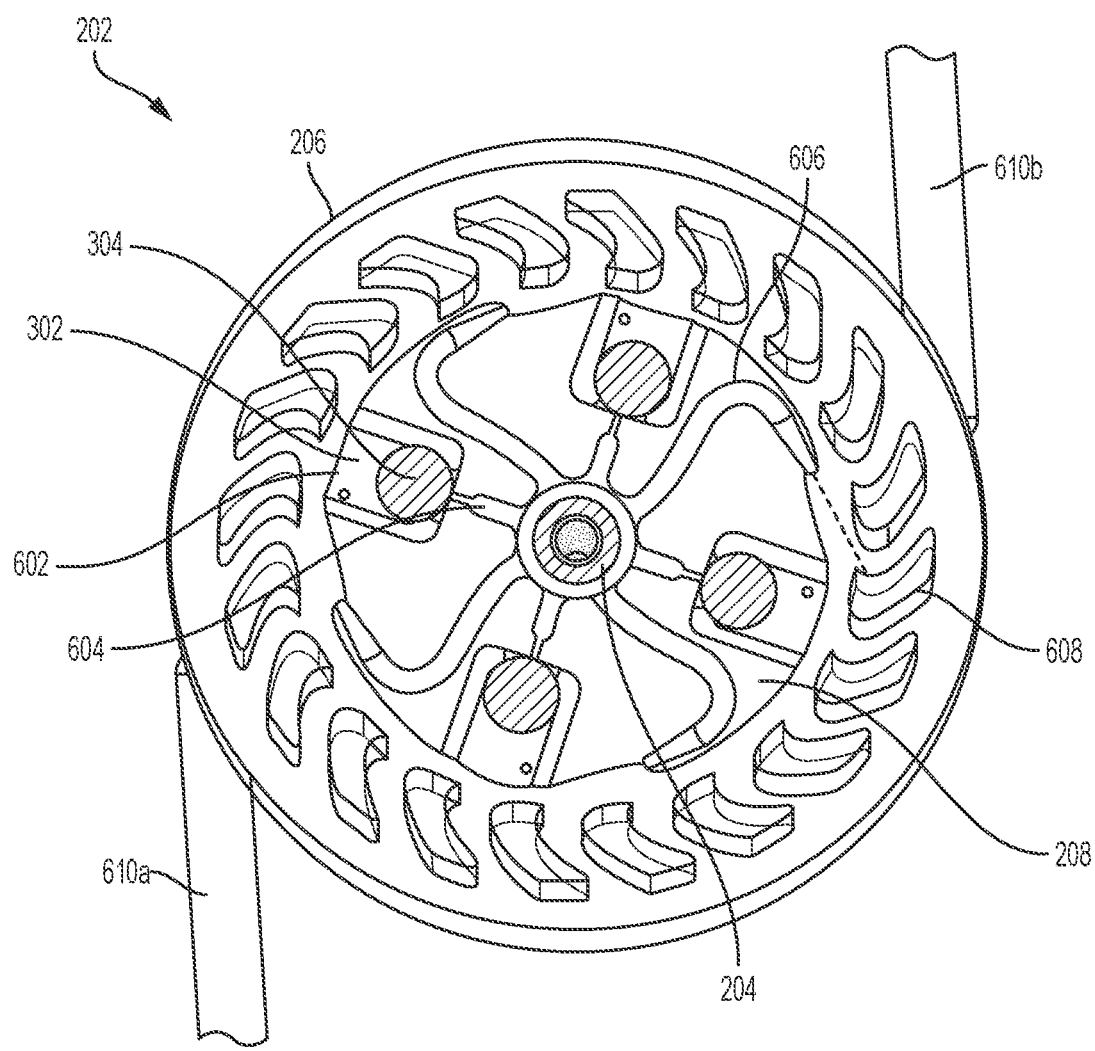
FIG. 6 is a cross-sectional view of another example of a fluid flow control device according to some aspects.

FIG. 6 is a cross-sectional view of another example of a fluid flow control device 202 according to some aspects. The fluid flow control device 202 can include a housing 206 having a rotatable component 208. The rotatable component 208 can rotate about an axis, which can be a central axis extending through a center of the housing 206. In this example, the inlet port 204 forms the axis around which the rotatable component 208 can rotate.

The rotatable component 208 can include one or more fluid pathways for communicating fluid from inside the rotatable component 208 to outside the rotatable component 208 toward outlet ports and tubulars 610a-b (e.g., control tubulars for controlling an inflow control device in some examples). In this example, there are four such fluid pathways. An example of such a fluid pathway is fluid pathway

604. Fluid can flow, via the fluid pathway 604, from the inlet port 204 toward the float component 304 positioned in the chamber 302. If the fluid is a higher-density fluid, the float component 304 can move into a closed position that creates a fluid seal and prevents the fluid from flowing out of the chamber 302 to the outlet ports. If the fluid is a lower-density fluid, the float component 304 can move into an open position that enables fluid flow out of the chamber 302 to the outlet ports.

The float component 304 can be maintained in the chamber 302 using one or more maintaining devices to prevent the float component 304 from being ejected from the chamber (e.g., as the rotatable component 208 rotates). For example, the float component 304 can be attached to a wall of the chamber 302 via a cord to prevent the float component 304 from exiting the chamber 302. As another example, a wire can be attached along an opening 602 of the chamber 302 to prevent the float component 304 from exiting the chamber 302. As yet another example, a protrusion can extend into the opening 602 of the chamber 302, which may reduce a diameter of the opening 602 to smaller than a diameter of the float component 304 to prevent the float component 304 from exiting the chamber 302. In some examples, the opening 602 may contain a narrow fluid pathway so that the float component 304 creates a flow restriction when the float component 304 presses against the narrow fluid pathway. In such an example, the rotatable component 208 can pass fluid when the fluid density is high (e.g., when the fluid is oil) and restrict fluid passage when the fluid density is low (e.g., when the fluid is gas).

The rotatable component 208 can also include one or more other types of fluid pathways, such as one or more fluid stream pathways for generating a fluid stream that causes the rotatable component 208 to rotate. FIG. 6 shows an example of a fluid stream pathway 606 generating a fluid stream, which is represented by a dashed line. The fluid stream pathway 606 can create a fluid stream that projects outwardly from the rotatable component 208 at relatively high pressure. In some examples, the fluid stream can impact a stationary component 608, which can be in a fixed position in the housing 206, or a wall of the housing 206. The impact of the fluid stream can cause the rotatable component 208 to rotate. The rotatable component 208 can include any number and combination of fluid stream pathways for generating any number and combination of fluid streams. The fluid stream pathways can have any suitable shape, such as the "7" shape shown in FIG. 6 or another shape. And the housing 206 can include any number (including zero) and combination of stationary components for facilitating rotation of the rotatable component 208. The stationary components can also have any suitable shape, such as the "U" shape shown in FIG. 6 or another shape.

Fluid can flow through the fluid pathways (e.g., fluid pathway 604 and fluid stream pathway 606) substantially simultaneously, causing the rotatable component 208 to rotate and generate a force on the float components. The force can improve the ability of the float components to toggle between the closed position and the open position, for example, as discussed above with respect to FIG. 2. In some examples, if the rotatable component 208 is rotated fast enough and the float components have sufficient mass, the float components can overcome any fluid pressure tending to bias the float components in their open positions, enabling the float components to toggle to the closed position.

Figure 7:
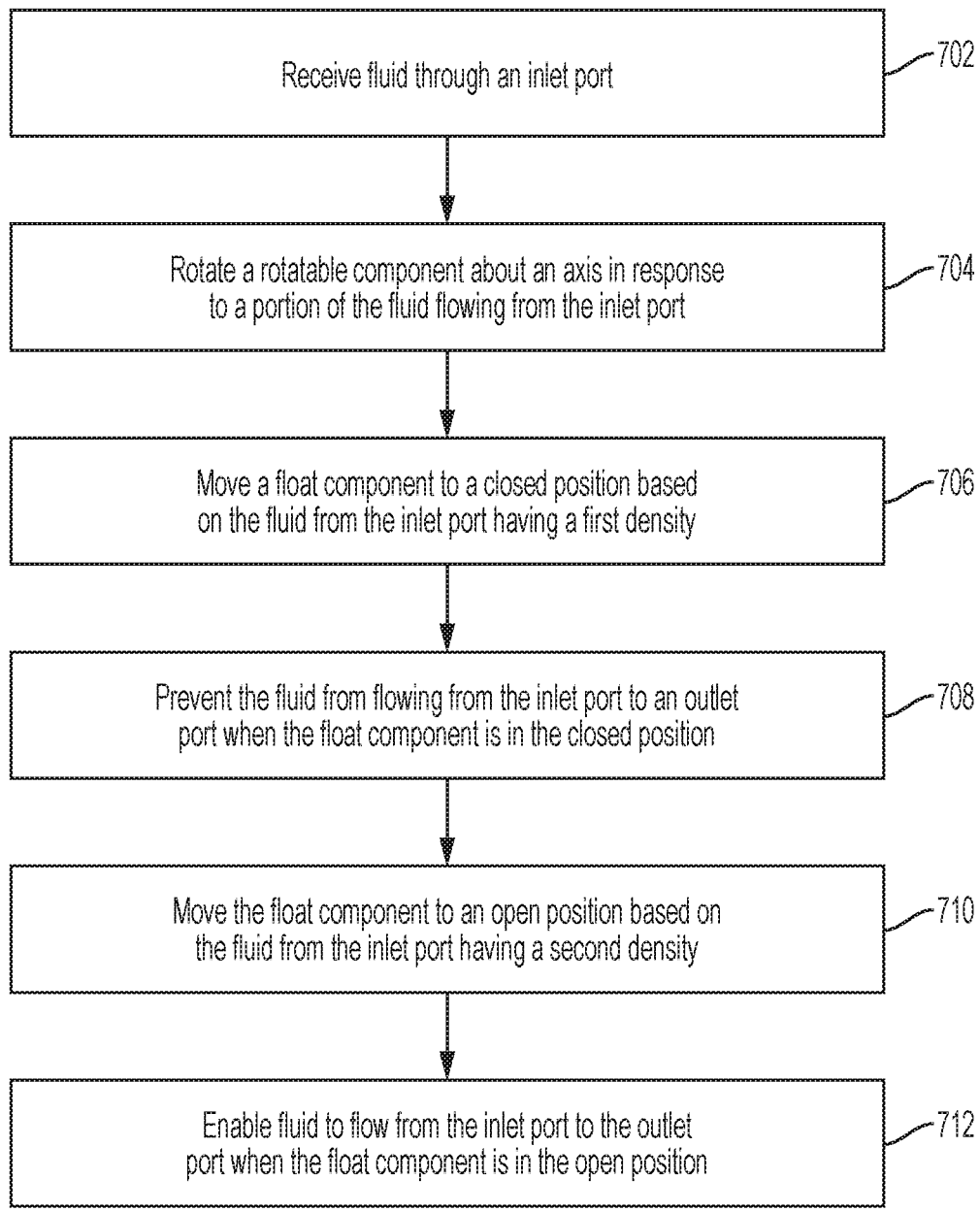
FIG. 7 is a flow chart of an example of a process for using a fluid flow control device according to some aspects.

FIG. 7 is a flow chart of an example of a process for using a fluid flow control device 202 according to some aspects. Some examples can include more steps, fewer steps, different steps, or a different order of the steps than depicted in FIG. 7. The steps below will be described with reference to the components discussed above.

In block 702, the fluid flow control device 202 receives fluid through an inlet port 204. The fluid can be formed from a mix of fluid components or have a single type of fluid component.

In block 704, the fluid flow control device 202 rotates a rotatable component 208 about an axis in response to a portion of the fluid flowing from the inlet port 204. The axis can be a central axis, such as axis 504.

In block 706, the fluid flow control device 202 moves a float component 304 to a closed position based on the fluid from the inlet port 204 having a first density. In some examples, the fluid flow control device 202 moves the float component 304 from an open position to the closed position based on the fluid from the inlet port 204 having the first density. Movement of the float component 304 to the closed position can be effectuated by a first force being applied to the float component 304 as the rotatable component 208 rotates about the axis. Examples of the first force can be a centripetal force or a centrifugal force.

In block 708, the fluid flow control device 202 prevents the fluid from flowing from the inlet port 204 to an outlet port 214 when the float component 304 is in the closed position. For example, the float component 304 can be pressed into a seat 402 that forms a fluid seal, preventing the fluid from flowing to the outlet port 214.

In block 710, the fluid flow control device 202 moves the float component 304 to the open position based on the fluid from the inlet port 204 having a second density. The second density can be lower than the first density. In some examples, the fluid flow control device 202 moves the float component 304 from the closed position to the open position based on the fluid from the inlet port 204 having the first density. Movement of the float component 304 to the open position can be effectuated by a second force being applied to the float component 304 as the rotatable component 208 rotates about the axis. Examples of the second force can be a centripetal force or a centrifugal force. The second force can be the same as or different from the first force.

In block 712, the fluid flow control device 202 enables the fluid to flow from the inlet port 204 to the outlet port 214 when the float component 304 is in the open position. For example, the float component 304 can lift off the seat 402, enabling the fluid to flow to the outlet port 214.

In some aspects, a density-based fluid flow control device can be implemented according to one or more of the following examples:

Example #1

A fluid flow control device can include a rotatable component for rotating about an axis in response to fluid flow from an inlet port of the fluid flow control device. The fluid flow control device can include a float component positioned within the rotatable component and movable between (i) an open position that enables fluid flow from the inlet port to an outlet port, and (ii) a closed position that restricts fluid flow from the inlet port to the outlet port. The float component can be movable to the closed position in response to a fluid from the inlet port having a first density and a centrifugal force being applied to the float component by rotating the rotatable component about the axis. The float component can be movable to the open position in response to the fluid from the inlet port having a second density and a centrifugal force being applied to the float component by rotating the rotatable component about the axis. The first density can be different than the second density.

Example #2

The fluid flow control device of Example #1 may feature a circular housing in which the rotatable component is positioned. And the axis can be a central axis extending through a cross-sectional center of the circular housing.

Example #3

The fluid flow control device of any of Examples #1-2 may feature the rotatable component including a plurality of fluid pathways between the inlet port and the outlet port. Each respective fluid pathway of the plurality of fluid pathways can have a respective chamber and a respective float component disposed in the respective chamber for enabling or disabling fluid flow through the respective fluid pathway based on a density of a fluid from the inlet port.

Example #4

The fluid flow control device of any of Examples #1-3 may feature the rotatable component including at least one protrusion extending radially outwardly away from the axis and toward a circular housing. The at least one protrusion can be operable to interact with fluid flowing from the inlet port to a bypass port and responsively cause the rotatable component to rotate about the axis.

Example #5

The fluid flow control device of any of Examples #1-4 may feature the rotatable component including a fluid pathway between the inlet port and an opening in at least one protrusion. The float component can be disposed in the fluid pathway for enabling or disabling fluid flow through the fluid pathway.

Example #6

The fluid flow control device of any of Examples #1-5 may feature the fluid flow control device forming at least part of an inflow control device for a well tool that is positionable in a wellbore. The float component can be movable from the open position to the closed position in response to the fluid from the inlet port being water. The float component can be movable from the closed position to the open position in response to the fluid from the inlet port being oil or gas.

Example #7

The fluid flow control device of any of Examples #1-6 may feature the outlet port forming the axis around which the rotatable component is configured to rotate. The inlet port can be positioned outside the rotatable component.

Example #8

The fluid flow control device of any of Examples #1-6 may feature the inlet port forming the axis around which the rotatable component is configured to rotate. The outlet port can be positioned outside the rotatable component.

Example #9

The fluid flow control device of Example #8 may feature the rotatable component including a fluid pathway from the inlet port to an outer perimeter of the rotatable component for projecting a fluid stream that rotates the rotatable component about the axis.

Example #10

A system can include a housing having an inlet port and an outlet port. The system can include a rotatable component positioned in the housing and being rotatable about a central axis of the rotatable component in response to fluid flow from the inlet port. The system can include a float component disposed in a chamber of the rotatable component and movable between (i) an open position that enables fluid flow from the inlet port to the outlet port, and (ii) a closed position that retricts fluid flow from the inlet port to the outlet port. The float component can be movable from the open position to the closed position in response to a fluid from the inlet port having a first density and a first force being applied to the float component by rotating the rotatable component about the central axis. The float component can be movable from the closed position to the open position in response to the fluid from the inlet port having a second density and a second force being applied to the float component by rotating the rotatable component about the central axis.

Example #11

The system of Example #10 may feature the rotatable component including a plurality of fluid pathways between the inlet port and the outlet port. Each respective fluid pathway of the plurality of fluid pathways can have a respective chamber and a respective float component disposed in the respective chamber for enabling or disabling fluid flow through the respective fluid pathway based on a density of a fluid from the inlet port.

Example #12

The system of any of Examples #10-11 may feature the rotatable component including at least one protrusion extending radially outwardly away from the central axis and toward the housing. The at least one protrusion can be operable to interact with fluid flowing from the inlet port to a bypass port and responsively cause the rotatable component to rotate about the central axis.

Example #13

The system of any of Examples #10-12 may feature the rotatable component including a fluid pathway between the inlet port and an opening in at least one protrusion coupled to the rotatable component. The float component can be disposed in the fluid pathway for enabling or disabling fluid flow through the fluid pathway.

Example #14

The system of any of Examples #10-13 may feature the outlet port forming the central axis around which the rotatable component is configured to rotate. The inlet port can be positioned outside the rotatable component.

Example #15

The system of any of Examples #10-13 may feature the inlet port forming the central axis around which the rotatable component is configured to rotate. The outlet port can be positioned outside the rotatable component.

Example #16

The system of any of Examples #10-15 may feature the rotatable component including a fluid pathway from the inlet port through the rotatable component. The fluid pathway can exclude the float component and be for projecting a fluid stream toward a stationary component positioned in the housing to rotate the rotatable component about the central axis.

Example #17

The system of any of Examples #10-16 may feature the outlet port and a bypass port being coupled to a vortex valve of an inflow control device.

Example #18

The system of any of Examples #10-17 may feature the inflow control device being positioned in a well tool usable in a wellbore.

Example #19

The system of any of Examples #10-18 may feature the float component being movable from the open position to the closed position in response to the fluid from the inlet port being water. The float component can be movable from the closed position to the open position in response to the fluid from the inlet port being a hydrocarbon.

Example #20

A method can include receiving, by a fluid flow control device, fluid through an inlet port of the fluid flow control device. The method can include rotating, by the fluid flow control device, a rotatable component about a central axis in response to a portion of the fluid flowing from the inlet port. The method can include moving, by the fluid flow control device, a float component positioned within the rotatable component to a closed position based on the fluid from the inlet port having a first density and a first force being applied to the float component as the rotatable component rotates about the central axis. The method can include preventing, by the float component in the closed position, the fluid from flowing from the inlet port to an outlet port of the fluid flow control device. The method can include moving, by the fluid flow control device, the float component to an open position based on the fluid from the inlet port having a second density and a second force being applied to the float component as the rotatable component rotates about the central axis. The method can include enabling, by the float component in the open position, the fluid to flow from the inlet port to the outlet port.

The foregoing description of the aspects, including illustrated aspects, of the invention has been presented only for the purpose of illustration and description and is not intended to be exhaustive or to limit the disclosure to the precise forms disclosed. Numerous modifications, adaptations, and uses thereof will be apparent to those skilled in the art without departing from the scope of this disclosure.

The invention claimed is:
1. A fluid flow control device comprising:
a rotatable component; and
a float component positioned within the rotatable component and movable between (i) an open position that enables fluid flow from an inlet port of the fluid flow control device to an outlet port, and (ii) a closed position that restricts fluid flow from the inlet port to the outlet port, the float component being movable to the closed position in response to a first fluid component from the inlet port having a first density and a centrifugal force being applied to the float component by rotating the rotatable component about an axis, and the float component being movable to the open position in response to a second fluid component from the inlet port having a second density and a centrifugal force being applied to the float component by rotating the rotatable component about the axis, the first density being different than the second density.

2. The fluid flow control device of claim 1, wherein:
the fluid flow control device further includes a circular housing in which the rotatable component is positioned; and
the axis is a central axis extending through a cross-sectional center of the circular housing.

3. The fluid flow control device of claim 2, wherein the rotatable component comprises a plurality of fluid pathways between the inlet port and the outlet port, each respective fluid pathway of the plurality of fluid pathways having a respective chamber and a respective float component disposed in the respective chamber for enabling or disabling fluid flow through the respective fluid pathway based on a density of a fluid from the inlet port.

4. The fluid flow control device of claim 3, wherein the rotatable component comprises at least one protrusion extending radially outwardly away from the axis and toward the circular housing, the at least one protrusion being operable to interact with fluid flowing from the inlet port to a bypass port and responsively cause the rotatable component to rotate about the axis.

5. The fluid flow control device of claim 4, wherein the rotatable component comprises a fluid pathway between the inlet port and an opening in the at least one protrusion, the float component being disposed in the fluid pathway for enabling or disabling fluid flow through the fluid pathway.

6. The fluid flow control device of claim 5, wherein:
the fluid flow control device forms at least part of an inflow control device for a well tool that is positionable in a wellbore;
the float component is movable from the open position to the closed position in response to the first fluid component from the inlet port being water; and
the float component is movable from the closed position to the open position in response to the second fluid component from the inlet port being oil or gas.

7. The fluid flow control device of claim 6, wherein the outlet port forms the axis around which the rotatable component is configured to rotate, and the inlet port is positioned outside the rotatable component.

8. The fluid flow control device of claim 1, wherein the inlet port forms the axis around which the rotatable component is configured to rotate, and the outlet port is positioned outside the rotatable component.

9. The fluid flow control device of claim 8, wherein the rotatable component comprises a fluid pathway from the inlet port to an outer perimeter of the rotatable component for projecting a fluid stream that rotates the rotatable component about the axis.

10. A system comprising:
a housing having an inlet port and an outlet port;

a rotatable component positioned in the housing; and a float component disposed in a chamber of the rotatable component and movable between (i) an open position that enables fluid flow from the inlet port to the outlet port, and (ii) a closed position that restricts fluid flow from the inlet port to the outlet port, the float component being movable from the open position to the closed position in response to a first fluid component from the inlet port having a first density and a first force being applied to the float component by rotating the rotatable component about a central axis of the rotatable component, and the float component being movable from the closed position to the open position in response to a second fluid component from the inlet port having a second density and a second force being applied to the float component by rotating the rotatable component about the central axis.

11. The system of claim 10, wherein the rotatable component comprises a plurality of fluid pathways between the inlet port and the outlet port, each respective fluid pathway of the plurality of fluid pathways having a respective chamber and a respective float component disposed in the respective chamber for enabling or disabling fluid flow through the respective fluid pathway based on a density of a fluid from the inlet port.

12. The system of claim 10, wherein the rotatable component comprises at least one protrusion extending radially outwardly away from the central axis and toward the housing, the at least one protrusion being operable to interact with fluid flowing from the inlet port to a bypass port and responsively cause the rotatable component to rotate about the central axis.

13. The system of claim 10, wherein the rotatable component comprises a fluid pathway between the inlet port and an opening in at least one protrusion coupled to the rotatable component, the float component being disposed in the fluid pathway for enabling or disabling fluid flow through the fluid pathway.

14. The system of claim 10, wherein the outlet port forms the central axis around which the rotatable component is configured to rotate, and the inlet port is positioned outside the rotatable component.

15. The system of claim 10, wherein the inlet port forms the central axis around which the rotatable component is configured to rotate, and the outlet port is positioned outside the rotatable component.

16. The system of claim 10, wherein the rotatable component comprises a fluid pathway from the inlet port through the rotatable component, the fluid pathway excluding the float component and being for projecting a fluid stream toward a stationary component positioned in the housing to rotate the rotatable component about the central axis.

17. The system of claim 10, wherein the outlet port and a bypass port are coupled to a vortex valve of an inflow control device.

18. The system of claim 17, wherein the inflow control device is positioned in a well tool usable in a wellbore.

19. The system of claim 10, wherein:
the float component is movable from the open position to the closed position in response to the first fluid component from the inlet port being water; and
the float component is movable from the closed position to the open position in response to the second fluid component from the inlet port being a hydrocarbon.

20. A method comprising:
receiving, by a fluid flow control device, fluid through an inlet port of the fluid flow control device;
rotating, by the fluid flow control device, a rotatable component about a central axis in response to a portion of the fluid flowing from the inlet port;
moving, by the fluid flow control device, a float component positioned within the rotatable component to a closed position based on a first fluid component from the inlet port having a first density and based on a first force being applied to the float component as the rotatable component rotates about the central axis;
preventing, by the float component in the closed position, the first fluid component from flowing from the inlet port to an outlet port of the fluid flow control device;
moving, by the fluid flow control device, the float component to an open position based on a second fluid component from the inlet port having a second density and based on a second force being applied to the float component as the rotatable component rotates about the central axis; and
enabling, by the float component in the open position, the second fluid component to flow from the inlet port to the outlet port.

* * * * *